United States Patent [19]

Dietrich et al.

[11] 4,309,522

[45] Jan. 5, 1982

[54] PROCESS FOR THE PRODUCTION OF EXTENSIVELY AMORPHOUS BUTENE-1-PROPENE-ETHENE TERPOLYMERS HAVING A HIGH SOFTENING POINT

[75] Inventors: Johannes Dietrich; Walter Dittmann; Albert Frese; Wolfgang Kilian, all of Marl, Fed. Rep. of Germany

[73] Assignee: Chemische Werke Huels, Aktiengesellschaft, Marl, Fed. Rep. of Germany

[21] Appl. No.: 171,689

[22] Filed: Jul. 24, 1980

[30] Foreign Application Priority Data

Jul. 25, 1979 [DE] Fed. Rep. of Germany ....... 2930108

[51] Int. Cl.³ .................. C08F 4/64; C08F 210/16
[52] U.S. Cl. ...................... 526/158; 260/33.6 PQ; 526/348.6; 526/916
[58] Field of Search .................. 526/158, 348.6, 916

[56] References Cited

U.S. PATENT DOCUMENTS

| | | | |
|---|---|---|---|
| 3,769,373 | 10/1973 | Reed et al. | 260/93.7 |
| 3,920,621 | 11/1975 | Baxmann et al. | 526/348.6 |
| 3,959,409 | 5/1976 | Frese et al. | 526/158 |
| 3,981,849 | 9/1976 | Frese et al. | 526/348.6 |
| 4,161,574 | 7/1979 | Strametz et al. | 526/348.6 |

FOREIGN PATENT DOCUMENTS

| | | |
|---|---|---|
| 821838 | 10/1959 | United Kingdom . |
| 828791 | 2/1960 | United Kingdom . |
| 1449316 | 9/1976 | United Kingdom . |

*Primary Examiner*—Stanford M. Levin
*Attorney, Agent, or Firm*—Millen & White

[57] ABSTRACT

A process for preparing an extensively amorphous butene-1-propene-ethene terpolymer having a high softening point comprises low pressure solution polymerizing butene-1, propene and ethene by contacting these monomers with a catalytically effective amount of a mixed catalyst of a thermally unstable crystalline $TiCl_3 \cdot 0.30$ to $0.35\ AlCl_3$ and a trialkyl aluminum or dialkyl aluminum hydride, each having alkyl groups of 2–4 carbon atoms, the atomic ratio of Al:Ti being 0.8–4.0.

8 Claims, No Drawings

PROCESS FOR THE PRODUCTION OF EXTENSIVELY AMORPHOUS BUTENE-1-PROPENE-ETHENE TERPOLYMERS HAVING A HIGH SOFTENING POINT

BACKGROUND OF THE INVENTION

The present invention relates to extensively amorphous butene-1-propene-ethene terpolymers.

Extensively amorphous polyolefins are required in various fields of use, for example for sealing sheets for roofs and other purposes, for coating compositions and sealing compounds, and for filling compounds and adhesives.

It is known from DAS (German Published Application) No. 2,306,667 (equivalent to British Pat. No. 1,449,316) to produce extensively amorphous butene-1-polymers using the low-pressure method by the polymerization of butene-1, optionally in the presence of 0.1–30% by weight, based on the amount of butene-1, of other olefins, in solution, at temperatures of 40°–120° C. using a mixed catalyst of $TiCl_3 \cdot n\, AlCl_3$ (n=0.2–0.6) and a trialkyl aluminum. These butene-1 polymers are very highly suited for many uses, but do have a softening point of 60°–85° C. which is too low for several areas of application, such as roofing sheets and other sealing sheets, for example. For such uses, amorphous polyolefins having softening points of 90°–130° C. are necessary.

Although extensively amorphous polypropylene exhibits higher softening points, it has not been possible heretofore to produce an extensively amorphous polypropylene in a simple and economical manner. Since, in addition to amorphous polypropylene, partially crystalline polypropylene is obtained in all cases, which latter is insoluble in hydrocarbons, polymerization in solution is impossible. A suspension of partially crystalline polypropylene in a highly viscous solution of amorphous polypropylene is always the result. This highly viscous solution and suspension can be controlled only with very great difficulty from the viewpoint of agitating technology. The removal of heat during polymerization also causes very great difficulty. Furthermore, the separation of the insoluble, partially crystalline polypropylene from the highly viscous solution presents an additional problem.

Co- and terpolymers of propene having a high propene content also show increased softening points, but the same difficulties occur during their production as do in the manufacture of extensively amorphous polypropylene. Additionally, incrustations occur during the polymerization of extensively amorphous polypropylene as well as of co- and terpolymers of propene having a high propene content, making the process very difficult and requiring regular cleaning operations. Therefore, there is still a need for extensively amorphous olefin polymers having softening points of 90°–130° C. whose production avoids such problems.

SUMMARY OF THE INVENTION

Accordingly, it is an object of this invention to provide an industrially useful process for the production of olefin polymers having softening points of 90°–130° C. whereby the forgoing difficulties are avoided.

Upon further study of the specification and appended claims, further objects and advantages of this invention will become apparent to those skilled in the art.

These objects have been attained by providing a process for preparing an extensively amorphous butene-1-propene-ethene terpolymer having a high softening point comprising low pressure solution polymerizing butene-1, propene and ethene by contacting these monomers with a catalytically effective amount of a mixed catalyst of a thermally unstable crystalline $TiCl_3 \cdot 0.30$ to $0.35\, AlCl_3$ and a trialkyl aluminum or dialkyl aluminum hydride, each having alkyl groups of 2–4 carbon atoms, the atomic ratio of Al:Ti being 0.8–4.0.

DETAILED DISCUSSION

The olefins to be polymerized, butene-1, propene and ethene, as well as the optional butene-2 and butane, are to be most extensively free of compounds having active hydrogen, especially water, alcohols, mercaptans, acetylenic hydrocarbons and polyunsaturated hydrocarbons, such as butadiene, especially 1,2-butadiene and propadiene, as well as free of oxygen.

Isobutene in larger amounts lowers the softening point of the polymer and the polymerization rate. Therefore, the isobutene proportion should preferably be below 1% by weight, based on the weight of butene-1.

Butene-1 is added to the polymerization blend in amounts of 25–76% by weight, preferably 30–70% by weight, especially 32–40% by weight; propene is added in quantities of 24–70% by weight, preferably 30–65% by weight, especially, 40–60% by weight; and ethene is added in amounts of 0.1–20% by weight, preferably 0.2–12% by weight, especially 0.5–10% by weight. Surprisingly, the terpolymers of this invention are soluble in hydrocarbons in spite of the high propene proportion and their high softening points. They, thus can be worked up without filtration. The incrustations formed in the manufacture of conventional extensively amorphous polypropylene, as well as co- and terpolymers of propene having a high propene content, are, surprisingly, absent in the production of the terpolymers of this invention.

Polymerization takes place in solution, continuously or discontinuously. Suitable solvents include butene-1 as well as mixtures of butene-1 with butene-2 and/or butane. The concentration of butene-1 in the solvent is generally 25–99.5 wt %. The ratio of butene-2 to butane can be selected at will; preferably, the $C_4$-fraction obtained in a refineries is employed. Practically, butene-2 does not polymerize at all in its mixtures with butene-1. Conventional inert diluents can be utilized, such as saturated hydrocarbons. However, preferably, the polymerization is conducted without the addition of further diluents.

The catalyst component to be employed is a thermally unstable, crystalline $TiCl_3 \cdot 0.3$ to $0.35\, AlCl_3$, obtained by the reduction of $TiCl_4$ with aluminum. These compounds according to the disclosures of German Pat. No. 1,209,297 (equivalent to British Pat. No. 877,050 and U.S. Pat. No. 3,769,373 whose disclosures are incorporated by reference herein) are supposedly unsuitable for the polymerization of olefins. Moreover, they have been asserted to be entirely unsuitable for the production of extensively amorphous olefin polymers according to DAS No. 1,795,483 (equivalent to British Pat. Nos. 821,838 and 828,791).

Suitable trialkyl aluminums or dialkyl aluminum hydrides having $C_2$- to $C_4$-alkyl groups include triethylaluminum, tripropylaluminum, tributylaluminum, diisobutylaluminum hydride, and, preferably, triisobutylaluminum.

Unless otherwise specified herein, all conditions and components of the process of this invention are as in the conventional low-pressure polymerization of olefins, e.g., as described in British Pat. No. 1,449,316, whose disclosure is incorporated by reference herein.

To prepare the mixed catalyst, the trialkyl aluminum or dialkyl aluminum hydride and the thermally unstable, crystalline $TiCl_3 \cdot 0.30$ to $0.35\ AlCl_3$ are introduced, for example, at the polymerization temperature into a polymerization reactor. It is possible to mix the components beforehand, but this is not required. The atomic ratio of Al:Ti in the finished catalyst is 0.8–4.0, preferably 1.5–2.5. This catalyst displays an excellent activity. Therefore, polymerization can be conducted even at very low catalyst concentrations, e.g., 0.01–0.3 millimole of $TiCl_3/l$. Suitably the catalyst is added in amounts of 0.01–1, preferably 0.03–0.3 millimole of $TiCl_3/l$, based on the entire liquid phase of the polymerization. Larger amounts of catalyst are required if impurities are present. According to this invention, catalytic yields of 2,500–50,000 parts by weight of butene-1-propene-ethene terpolymer are attained per part by weight of $TiCl_3$ catalyst.

The molecular weight can be regulated during polymerization in conventional fashion, suitably by adding hydrogen and/or by elevating the temperature in the range of 50° and 100° C.

Polymerization takes place at temperatures of 50°–100° C., preferably at 60°–85° C., suitably under pressures of 5–20 bar.

The extensively amorphous butene-1-propene-ethene terpolymers obtained by the process of this invention are completely soluble in boiling heptane and have ether-soluble proportions of 60–99%, preferably 70–97%, softening points of 90°–135° C., preferably 100°–130° C., with penetration values of 8–30 $mm^{-1}$, preferably 12–25 $mm^{-1}$, viscosities of 1,000–100,000 mPa·sec at 190° C., and viscosity numbers J of 20–150 cc/g. Surprisingly, an increase in molecular weight (i.e., of the viscosity numbers J) entails greater hardness, as measured by penetration.

It is a substantial advantage of the process of this invention that, using an extremely simple and economical solution polymerization process without filtration, extensively amorphous butene-1-propene-ethene terpolymers are obtained having high softening points and a freely settable penetration within the range permitted by variation of conditions and components per this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example(s), all temperatures are set forth uncorrected in degrees Celsius; unless otherwise indicated, all parts and percentages are by weight.

EXAMPLE 1

Using a mixed catalyst of 0.003 part by weight of a crystalline, thermally unstable $TiCl_3 \cdot 0.33\ AlCl_3$ (aluminum-reduced $TiCl_3$ from Titangesellschaft, type ATRP) and 0.01 part by weight of triisobutylaluminum, 120 parts by weight of a mixture of 70% by weight of butene-1, 29.5% by weight of propene, and 0.5% by weight of ethene is polymerized at 90° C., under a total pressure of 19–15 bar in an agitated vessel. After a polymerizing period of 4 hours, the polymerization is stopped by the addition of 0.1 part by weight of water. In an evaporator, the unreacted monomers are vaporized. The melt of the extensively amorphous butene-1-propene-ethene terpolymer is discharged at a temperature of 160–200° C. Yield: 110 parts by weight (conversion 92%) of a butene-1-propene-ethene terpolymer having the following properties:

| | |
|---|---|
| Viscosity Number J | 52 cc/g measured according to DIN 53,728 |
| $M_V$ | 136,000 |
| Melt viscosity | 40,000 mPa . sec/190° C. |
| Heptane-soluble proportions | 100% DIN 53,738 |
| Ether-soluble proportions | 86% |
| Penetration | 11.5 $mm^{-1}$ DIN 1995 |
| Softening point (Ring and Ball) | 91° DIN 1995 |
| Brittle point according to Fraass | −29° C. DIN 1995 |
| Propene proportion | 34% by weight $^{13}$C-NMR spectrum |
| Ethene proportion | 1% by weight IR spectrum |

EXAMPLE 2

Into a pressure-proof agitated vessel, 260 parts by weight per hour of a $C_4$-cut is introduced at 60° C. It contains 52% butene-1, 40% butene-2 and 8% butane. Also introduced are 208 parts by weight of propene and 3.5 parts by weight of ethene, 0.01 part by weight of the crystalline, thermally unstable $TiCl_3 \cdot 0.33\ AlCl_3$ used in Example 1, and 0.035 part by weight of triisobutylaluminum.

Polymerization is conducted at a partial hydrogen pressure of 2 bar under a total pressure of 12 bar. After an average residence time of 18 hours, the polymer solution is transferred into a downdraft evaporator by way of a valve element controlled by the level in the polymerization reactor. Additionally, 0.4 part by weight per hour of a 10% aqueous ammonia solution is introduced via nozzles into this evaporator. At a temperature of 190° C. the unreacted hydrocarbons are separated along with small amounts of lower-boiling oligomers. The melt of the extensively amorphous butene-1-propene-ethene terpolymer is allowed to cool in molds, thus obtaining, per hour, 290 parts by weight of an extensively amorphous olefin polymer having the following properties:

| | |
|---|---|
| Viscosity Number J | 35 cc/g measured according to DIN 53,728 |
| $M_V$ | 90,000 |
| Melt viscosity | 10,000 mPa . sec/190° C. |
| Heptane-soluble proportions | 100% DIN 53,738 |
| Ether-soluble proportions | 94% |
| Penetration | 15 $mm^{-1}$ DIN 1995 |
| Softening point (Ring and Ball) | 125–130° C. DIN 1995 |
| Brittle point according to Fraass | −28° C. DIN 1995 |
| Propene proportion | 65% by weight $^{13}$C-NMR |

| | -continued |
|---|---|
| Ethene proportion | spectrum 1.7% by weight IR spectrum |

EXAMPLES 3-5

The procedure of Example 2 is followed, but using a reaction temperature of 80° C. and the partial hydrogen pressures indicated in the following table. The quantities of monomers are introduced as set forth in the table, and the characteristic values of the products as indicated in the table are thus obtained.

TABLE

| Example | Parts by Weight of Monomers | | | Partial $H_2$ Pressure, bar | Viscosity Number J cc/g | Melt Viscosity mPa . sec at 190° C. |
|---|---|---|---|---|---|---|
| | Ethene | Propene | Butene-1 | | | |
| 3 | 28 | 215 | 104 | 1.5 | 92 | 90,000 |
| 4 | 17 | 208 | 121 | 1.6 | 78 | 60,000 |
| 5 | 35 | 201 | 111 | 1.8 | 69 | 30,000 |

| Example | Softening Point °C. Ring and Ball | Penetration $mm^{-1}$ | Propene Proportion % by Wt. | Ethene Proportion % by Wt. | Brittle Point According to Fraass °C. |
|---|---|---|---|---|---|
| 3 | 112 | 14 | 66 | 10 | −31 |
| 4 | 110 | 12 | 64 | 7 | −27 |
| 5 | 100 | 20 | 63 | 11 | −33 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for preparing an extensively amorphous butene-1-propene-ethene terpolymer having a high softening point of 90°-135° C. comprising low pressure solution polymerizing 25-76% by weight of butene-1, 24-70% by weight of propene and 0.1-20% by weight of ethene by contacting these monomers with a catalytically effective amount of a mixed catalyst of a thermally unstable, crystalline $TiCl_3 \cdot 0.030$ to $0.35$ $AlCl_3$ prepared by the reduction of $TiCl_4$ with Al, and a trialkyl aluminum or dialkyl aluminum hydride, each having alkyl groups of 2-4 carbon atoms, the atomic ratio of Al:Ti being 0.8-4.0 whereby said extensively amorphous terpolymer is produced.

2. A process of claim 1 wherein the solution polymerization is conducted in butene-1 or a mixture of butene-1, butene-2 or butane.

3. The process of claim 1 wherein the temperature is 50°-100° C.

4. The process of claim 1 wherein the amount of catalyst is 0.01-1 millimole of $TiCl_3$ per liter of liquid phase.

5. A process of claim 1 wherein the amounts of monomers are 25-76% by weight of butene-1, 24-70% by weight of propene and 0.1-20% by weight of ethene, the thermally unstable, crystalline $TiCl_3$ 0.3 to 0.35 $AlCl_3$ is prepared by the reduction of $TiCl_4$ with Al, the solution polymerization is conducted in butene-1 or a mixture of butene-1, butene-2 or butane, and the temperature is 50°-100° C.

6. A process of claim 1 wherein the terpolymer produced has a softening point of 100°-135° C.

7. The extensively amorphous butene-1-propene-ethene terpolymer prepared by the process of claim 1, having a softening point of 90°-135° C., an ether soluble proportion of 60-99%, a penetration value of 8-30 $mm^{-1}$, a viscosity of 1,000-100,000 mPa·sec at 190°0 C., and a viscosity number J of 20-150 cc/g.

8. The extensively amorphous butene-1-propene-ethene terpolymer of claim 7 having a softening point of 100°-135° C.

* * * * *